(12) United States Patent
Nakagawa et al.

(10) Patent No.: US 6,555,056 B2
(45) Date of Patent: Apr. 29, 2003

(54) METHOD OF PRESERVING SILICONE COMPOSITION AND KIT OF SEPARATE PACKAGES

(75) Inventors: Hiroyuki Nakagawa, Tokuyama (JP); Toshio Kawaguchi, Touyama (JP); Yasuhiro Hosoi, Tokuyama (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 09/726,477

(22) Filed: Dec. 1, 2000

(65) Prior Publication Data
US 2002/0098113 A1 Jul. 25, 2002

(30) Foreign Application Priority Data
Dec. 1, 1999 (JP) ............................. 11-342298

(51) Int. Cl.$^7$ .................... B01J 19/00; C08G 77/04; C08F 2/46; C08J 3/28
(52) U.S. Cl. ..................... 422/40; 422/1; 422/33; 422/61; 422/120; 422/255; 524/497; 524/588; 524/847; 524/863; 524/783; 522/42; 522/80; 522/99; 522/145; 528/34
(58) Field of Search ................. 422/1, 28, 33, 422/40, 61, 117, 120, 255; 524/497, 588, 863, 783, 847; 522/42, 145–148, 80–89, 99; 528/34

(56) References Cited

U.S. PATENT DOCUMENTS

| 3,865,588 | A | * | 2/1975 | Ohto et al. |
| 5,188,864 | A | * | 2/1993 | Lee et al. |
| 5,424,354 | A | * | 6/1995 | Takeoka |
| 6,235,358 | B1 | * | 5/2001 | Goto et al. |

* cited by examiner

Primary Examiner—Robert J. Warden, Sr.
Assistant Examiner—Monzer R. Chorbaji
(74) Attorney, Agent, or Firm—Birch, Stewart, Kolasch & Birch, LLP

(57) ABSTRACT

A method of preserving two or more separately packaged agents for forming a silicone composition which can be cured by mixing the separately packaged agents, which method can reduce the number of air bubbles contained in a cured product of the silicone composition and prevent a reduction in the strength of the cured product. The method of preserving the composition is characterized by keeping each packaged agent of the curable silicone composition under reduced pressure.

12 Claims, No Drawings

METHOD OF PRESERVING SILICONE COMPOSITION AND KIT OF SEPARATE PACKAGES

BACKGROUND OF THE INVENTION

1. Field of the Invention

The present invention relates to a method of preserving components which are separately packaged and mixed together to form a curable silicone composition and to a kit of separate packages.

2. Prior Art

Since silicone materials have excellent characteristic properties such as weatherability, electric properties, low compression set, heat resistance and freeze resistance, they have recently been used in a wide variety of fields such as electronic equipment, automobiles, construction, medical treatment and foods. Silicone materials which are cured at normal temperature are used in such materials as heat resistant coatings, adhesives, coating materials, construction sealing materials, dental silicone rubber impression materials, soft relining materials for denture and the like.

3. Problems to be Solved by the Invention

However, the silicone material which is cured at normal temperature tends to gradually take in air from gaps in a container while it is kept and to dissolve the air in a paste or solution. The dissolved air cannot be dissolved in the material at the time of curing with the result that it remains in its cured product as air bubbles. Therefore, the cured product containing air bubbles involves various problems such as a reduction in the strength of the material itself, a roughened surface due to the low chipping resistance of the surface of the material, a reduction in transparency and deterioration in air tightness. The inventors of the present invention have discovered in the course of the long-term research and development of this silicone material that this material has the above problems.

4. Means for Solving the Problems

The present inventors have conducted intensive studies to solve the above problems and have found that a silicone composition which can provide a cured product containing an extremely small number of air bubbles is obtained by keeping separately packaged agents of each components for forming the silicone composition under reduced pressure and that the cured product containing an extremely small number of air bubbles is free from a reduction in strength and deterioration in surface roughness. The present invention has been accomplished based on the findings.

That is, it is an object of the present invention to provide a method of preserving two or more separately packaged agents for forming a curable silicone composition by mixing together the separately packaged agents, wherein the each separately packaged agents are kept under reduced pressure. It is another object of the present invention to provide a kit of two or more separately packaged agents for forming a curable silicone composition by mixing the separately packaged agents, wherein each separately packaged agent is charged into a container and the container is enclosed in a decompressed sealing material.

SUMMARY OF THE INVENTION

Description of the Embodiments

The curable silicone composition in the present invention is a polyorganosiloxane composition which can be cured by mixing two or more separately packaged agents and which comprises (a) a polyorganosiloxane base polymer, (b) a crosslinking agent and (c) a curing catalyst as basic components. This composition may be used after various additives are uniformly dispersed therein as required.

The above components used in the composition, namely, (a) the polyorganosiloxane base polymer (b) crosslinking agent and (c) curing catalyst are suitably selected according to a curing reaction mechanism for obtaining a rubber elastic material or viscoelastic material. As the curing reaction mechanism, there are known (1) curing caused by a condensation reaction and (2) curing caused by an addition reaction, and a preferred combination of the components (a), (b) and (c) is determined by the reaction mechanism.

The basic structure of the polyorganosiloxane as the base polymer which is the component (a) used in the above reaction mechanisms is a polysiloxane having an organic group such as a monovalent substituted or nonsubstituted hydrocarbon group, alkyl group exemplified by methyl, ethyl, propyl, butyl, hexyl and dodecyl, aryl group exemplified by phenyl, non-substituted hydrocarbon group exemplified by aralkyl groups including β-phenylethyl and β-phenylpropyl, or substituted hydrocarbon group exemplified by chloromethyl and 3,3,3-trifluoropropyl; or a polysiloxane obtained by modifying part of these molecules according to the type of curing reaction mechanism. Out of these, a polysiloxane having a methyl group as an organic group is preferred because it can be easily synthesized.

The polyorganosiloxane base polymer (a), crosslinking agent (b) and curing catalyst (c) in the above curing reaction mechanisms (1) and (2) will be described in detail hereinafter.

The base polymer as the component (a) in the above condensation reaction (1) is preferably a polyorganosiloxane having the above basic structure and a hydroxyl group at both terminals. Illustrative examples of the polyorganosiloxane are represented by the following formulas.

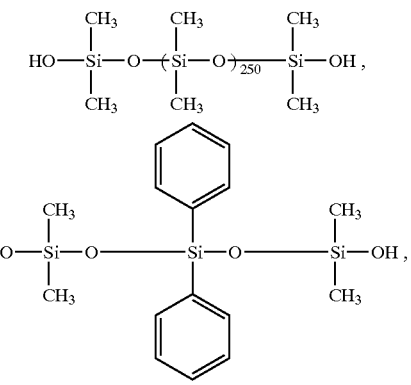

Illustrative examples of the crosslinking agent as the component (b) in the condensation reaction include alkoxysilanes such as ethyl silicate, propyl silicate, methyl trimethoxysilane, vinyl trimethoxysilane, methyl. triethoxysilane, vinyl triethoxysilane, methyl tris (methoxyethoxy)silane, vinyl tris(methoxyethoxy)silane and methyl tripropenoxysilane; acetoxysilanes such as methyl triacetoxysilane and vinyl triacetoxysilane; oximesilanes such as methyl tri(acetoneoxime)silane, vinyl tri (acetoneoxime)silane, methyl tri(methylethylketoxime) silane and vinyl tri(methylethylketoxime)silane; and partly hydrolyzed products thereof. Further, cyclic siloxanes such as hexamethyl-bis(diethylaminoxy)cyclotetrasiloxane, tetramethyldibutyl-bis(diethylaminoxy)cyclotetrasiloxane, heptamethyl(diethylaminoxy)cyclotetrasiloxane, pentamethyl-tris(diethylaminoxy)cyclotetrasiloxane, hexamethyl-bis(methylethylaminoxy)cyclotetrasiloxane and tetramethyl-bis(diethylaminoxy)-mono (methylethylaminoxy) cyclotetrasiloxane may also be used. Further, the above polyorganosiloxane base polymer may be used alone or in combination of two or more.

The crosslinking agent may have a silane or siloxane structure and the siloxane structure thereof may be linear, branched or cyclic. Further, the above crosslinking agents may be used alone or in combination of two or more.

The amount of the crosslinking agent as the component (b) is preferably 0.1 to 20 parts by weight based on 100 parts by weight of the base polymer as the component (a). When the amount of the crosslinking agent is smaller than 0.1 part by weight, the obtained cured product cannot have sufficient strength and when the amount is larger than 20 parts by weight, the cured product becomes fragile and can hardly be put to practical use.

Illustrative examples of the curing catalyst as the component (c) in the condensation reaction include metal carboxylates such as iron octoate, cobalt octoate, manganese octoate, tin naphthenate, tin caprylate and tin oleate; and organic tin compounds such as dimethyltin dioleate, dimethyltin dilaurate, dibutyltin diacetate, dibutyltin dioctoate, dibutyltin dilaurate, dibutyltin dioleate, diphenyltin diacetate, dibutyltin oxide, dibutyltin dimethoxide, dibutyl bis (triethoxysiloxy) tin and dioctyltin dilaurate.

The amount of the curing catalyst as the component (c) is preferably 0.01 to 5.0 parts by weight based on 100 parts by weight of the base polymer as the component (a). Below 0.01 part by weight, the curing catalyst does not serve fully as a curing catalyst, curing takes long time, and an interior portion far from the contact surface with air of the composition is not completely cured. Above 5.0 parts by weight, shelf life becomes short. The amount is more preferably 0.1 to 3.0 parts by weight.

The base polymer as the component (a) in the above addition reaction (2) is, for example, a polyorganosiloxane having the above basic structure, preferably a polyorganosiloxane having organic groups bonded to silicon atoms in one molecule at least two of which are an alkenyl group such as vinyl, propenyl, butenyl or hexenyl. A polyorganosiloxane having a vinyl group out of the above groups is particularly preferred because it is easily synthesized and acquired. Typical examples of the polyorganosiloxane are represented by the following formulas.

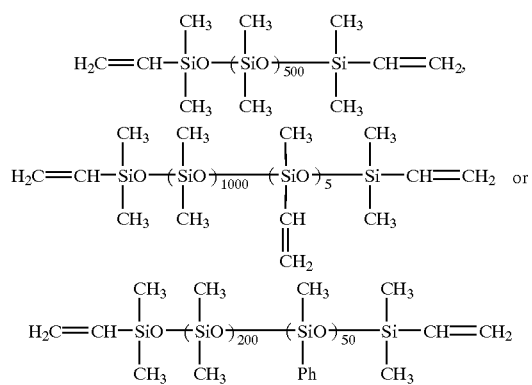

(Ph is a phenyl group. The same shall apply hereinafter). Further, the above polyorganosiloxane may be used alone or in combination of two or more.

The crosslinking agent as the component (b) in the addition reaction is preferably a polyorganosiloxane having the above basic structure and at least two hydrogen atoms bonded to a silicon atom(s) in one molecule. Typical examples of the above polyorganosiloxane are represented by the following formulas. Further, the following crosslinking agent may be used alone or in combination of two or more.

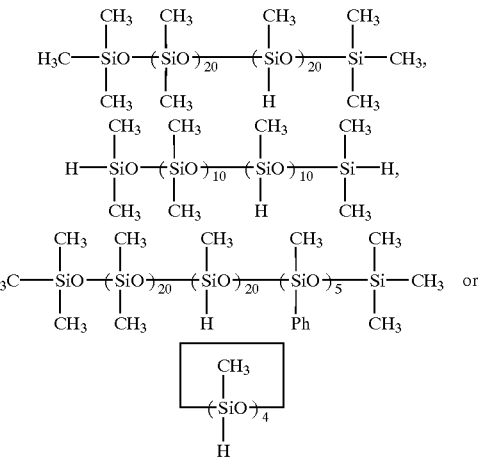

The amount of the crosslinking agent as the component (b) is such that the number of hydrogen atoms bonded to a silicon atom(s) contained in the crosslinking agent is preferably 0.5 to 4.0, more preferably 1.0 to 3.0 based on 1 alkenyl group contained in the component (a). When the number of hydrogen atoms is smaller than 0.5, the curing of the composition does not proceed fully and the hardness of the cured composition lowers and when the number of hydrogen atoms is larger than 4.0, the physical properties and heat resistance of the cured composition deteriorate.

Illustrative examples of the curing catalyst as the component (c) in the addition reaction include platinumbased catalysts such as chloroplatinic acid, platinum-olefin complex, platinum-vinylsiloxane complex, platinum black and platinum-triphenylphosphine complex. The amount of the curing catalyst as the component (c) is preferably 1 to 1,000 ppm in terms of elemental platinum based on the base polymer as the component (a). When the amount of the curing catalyst is smaller than 1 ppm in terms of elemental platinum, curing does not proceed fully and when the amount is larger than 1,000 ppm, the improvement of the curing speed cannot be expected.

Out of the above curable silicone compositions, a composition obtained by the addition reaction (2) is preferred because there is no by-product formed by curing and dimensional stability and coloring resistance is excellent.

In the present invention, a filler and other additives may be blended into the curable silicone composition as required in limits that do not greatly deteriorate the physical properties of the silicone composition.

Typical examples of the filler include reinforcing fillers such as fumed silica, precipitated silica and diatomaceous earth; aluminum oxide; mica; clay; zinc carbonate; glass bead; silicone resin powders such as polyoganosilsequioxane; fluorocarbon resin powders such as polytetrafluoroethylene and polyvinylidene fluoride; carbon black; glass fiber; composite filler (pulverized product of a composite of an inorganic oxide and a polymer); and the like.

The additives include a hydrogen gas absorbent such as platinum black or fine granular palladium, reaction inhibitor, ultraviolet light absorber, plasticizer, pigment, antioxidant, anti-fungus agent and the like.

The crosslinking agent as the component (b) and the curing catalyst as the component (c) of the curable silicone composition in the present invention are packaged separately to be not co-presence (a condensation reaction or addition reaction does not take place while they are preserved) and generally prepared as pastes, paste and liquid, or liquids. In consideration of the volatilization difficulty of these components under reduced pressure and the easiness of kneading work, these components are both preferably prepared as pastes.

A typical example of a combination of the separate packages for the condensation reaction (1) is a combination of a package of a composition comprising (a) a polyorganosiloxane base polymer, (b) a polyorganosilane crosslinking agent and fumed silica as basic components and another package of a composition comprising (a) a base polymer, (c) an organic tin compound and fumed silica as basic components.

A typical example of a combination of the separate packages for the addition reaction (2) is a combination of a package of a composition comprising (a) a polyorganosiloxane base polymer, (b) a polyorganosiloxane crosslinking agent and fumed silica as basic components and another package of a composition comprising (a) a base polymer, (b) a platinum-vinylsiloxane complex and fumed silica as basic components.

These compositions can be prepared as paste or liquid compositions by measuring appropriate amounts of components to be cured and necessary components out of a filler and other additives and kneading or stirring them using a general kneading machine such as a kneader or planetary mixer, or general stirrer until homogeneous compositions are obtained.

The thus prepared compositions are each preferably charged into respective containers to be separately packaged. In the present invention, these packaged compositions are kept under reduced pressure. Right after they are charged into the containers, the containers may be decompressed and then kept in a sealing material. Alternatively, after they are charged into the containers, they may be kept as they are for a while and then the containers are decompressed as required and kept in a sealing material. However, it is preferred to keep them under reduced pressure as much as possible while they are preserved. Examples of the sealing material for keeping them under reduced pressure include a bag, bottle, case and the like. Any sealing material is accepted if it can be decompressed.

The degree of vacuum for preservation is not particularly limited but preferably in the range of 0.1 to 600 mmHg, more preferably 100 to 400 mmHg. When the degree of vacuum is higher than 0.1 mmHg, the paste in the container may overflow at the time of vacuum and the curing catalyst component (chelating gent) and the like volatilize and affect the total proceeding time and the physical properties of the obtained cured prdouct. When the degree of vacuum is lower than 600 mmHg, the effect of removing air bubbles weakens disadvantageously.

The containers for containing the separated compositions are not particularly limited but maybe a syringe, tube or the like. Preferable example for a syringe is a cartridge, wherein a composition comprising the base polymer (a) and the crosslinking agent (b) as basic components and a composition comprising the base polymer (a) and the curing catalyst (c) as basic components are charged into syringes which are integrated with each other and stored in the each syringes of the cartridge. The two separated compositions packaged in the respective syringes of the cartridge are extruded by a dispenser and mixed together by a static mixer attached to the ends of the syringes to form a curable silicone composition.

Typical examples of the method of preservation under reduced pressure include one in which containers containing these compositions are placed in sealing materials and decompressed by a vacuum pump and the sealing materials are sealed up by heat, one using a chuck sealing material, one in which containers containing these compositions are placed in sealing materials and sealed up by a special hermetically packaging machine, one in which containers are placed in compression bags having a sealing tape and a check valve, the sealing tape are closed, and the bags are decompressed by a suction device from the check valves; and one in which decompression is carried out using a vacuum at a dental clinic. The effect of the present invention can be fully maintained by decompressing the opened containers using similar methods.

Since a bag can be transformed to the shape of the container containing the separated agent, it is particularly preferred as a sealing material. Examples of the material of the bag include polyethylene, polypropylene, polyvinyl chloride, polyvinylidene chloride, cellulose acetate, polyamide resins and the like. Out of these materials, polyamide resins having low oxygen permeability and nitrogen permeability are particularly preferred. Two or more of them may be laminated together. Further, a laminate of a resin, aluminum foil and the like, or a film evaporated with fine silica powders or the like may be preferably used.

EXAMPLES

The following examples are provided for the purpose of further illustrating the present invention but are in no way to be taken as limiting. The viscosity is a value at 25° C.

Examples 1 to 3 and Comparative Examples 1 to 3

A paste (A) comprising 60 parts by weight of dimethyl siloxane (50,000 cSt) capped by a dimethyl vinylsiloxy group at both terminals which is a base monomer, 40 parts by weight of polymethylsilsequioxane particles (average particle diameter of 2 $\mu$m) and 20 ppm of a platinum-polymethylvinylsiloxane complex was prepared. A paste (B) comprising 60 parts by weight of dimethyl siloxane (50,000 cSt) capped by a dimethyl vinylsiloxy group at both terminals which is a base monomer, 40 parts by weight of polymethylsilsequioxane particles (average particle diameter of 2 $\mu$m) and 1.5 parts by weight of polymethylhydrogen siloxane (20 cSt) capped by a both terminal trimethylsilyl group and having a content of hydrogen atoms bonded to a silicon atom(s) of 0.7 wt % was prepared. 25 g of the paste (A) and 25 g of the paste (B) were charged into two syringes of a cartridge which was then sealed by piston and silicone O-ring. This cartridge was placed in a bag of a laminate film consisting of a 15 $\mu$m-thick nylon 6 outer film and a 60 $\mu$m-thick polyethylene inner film and the bag was evacuated to 270 mmHg and sealed by heat.

The pastes (A) and (B) contained in the bag which was evacuated and sealed by heat were kept for 6 months and the pastes (A) and (B) contained in the cartridge under normal pressure were kept at normal pressure and room temperature (Example 1 and Comparative Example 1), kept in thermostatic chambers maintained at 25° C. (Example 2 and Comparative Example 2) and chambers programmed to be maintained at 15° C. for 12 hours and 30° C. for 12 hours each day (Example 3 and Comparative Example 3) for 6 months. Thereafter, a mixing chip was attached to each cartridge, the pastes were extruded by a dispenser to be kneaded together, and the number of air bubbles contained in 1 g of each of the obtained cured products was counted. In Examples and Comparative Examples, the mean value of measurement data obtained for 5 samples under the same conditions was taken as the average number of air bubbles. The results are shown in Table 1.

Three JIS-3 dumbbell-like test samples (thickness of 2 mm) was manufactured and kept under water heated at 37° C. for one night and the tensile strength at break of each of the test samples was measured at a load cell capacity of 5 kgf and a cross head speed of 10 mm/min by an autograph (AG5000D computer controlled precision universal tester of Shimadzu Corporation). The results are also shown in Table 1.

methyl tris(butanoneoxime)silane was prepared. A paste (D) comprising 80 parts by weight of polydimethylsiloxane (10,000 cSt) capped by a silanol group at both terminals which is a base monomer, 20 parts by weight of fumed silica surface treated with polymethylsiloxane (specific surface area of 200 $m^2$/g) and 0.3 part by weight of dibutyltin dilaurate was prepared. 25 g of the paste (C) and 25 g of the paste (D) were charged into two syringes of a cartridge which was then sealed by piston and silicone O-ring. This cartridge was placed in a bag of a laminate film consisting of a 15 µm-thick nylon 6 outer film and a 60 µm-thick polyethylene inner film and the bag was evacuated to 270 mmHg and sealed by heat.

The pastes (C) and (D) contained in the bag which was evacuated and sealed by heat were kept for 6 months and the pastes (C) and (D) contained in the cartridge under normal pressure were kept at normal pressure and room temperature

TABLE 1

|  | decompression and sealing by heat | preservation state | number of air bubbles | tensile strength/MPa |
|---|---|---|---|---|
| Ex. 1 | used | room temperature | 2 | 2.2 |
| Ex. 2 | used | 25° C. thermostatic chamber | 7 | 2.3 |
| Ex. 3 | used | 15 to 30° C. | 6 | 2.2 |
| C. Ex. 1 | not used | room temperature | 46 | 1.7 |
| C. Ex. 2 | not used | 25° C. thermostatic chamber | 91 | 1.7 |
| C. Ex. 3 | not used | 15 to 30° C. | 235 | 1.6 |

Ex.: Example
C. Ex.: Comparative Example

It is understood from the results of Table 1 that the average number of air bubbles of a cured product manufactured from the silicone composition contained in the present invention which is cured by an addition reaction and whose components are kept under reduced pressure is much smaller in the three types of preservation state than that of a cured product manufactured from a silicone composition which is cured by an addition reaction and whose components are kept at normal pressure. It is also understood that the tensile strength of a cured product manufactured from the silicone composition of the present invention whose components are kept under reduced pressure is much higher in the three types of preservation state than that of a cured product manufactured from a composition whose components are kept at normal pressure. It is understood from this that the preservation method of the present invention is effective.

Examples 4 to 6 and Comparative Examples 4 to 6

A paste (C) comprising 80 parts by weight of polydimethylsiloxane (10,000 cSt) capped by a silanol group at both (Example 4 and Comparative Example 4), kept in thermostatic chambers maintained at 25° C. (Example 5 and Comparative Example 5) and chambers programmed to be maintained at 15° C. for 12 hours and 30° C. for 12 hours each day (Example 6 and Comparative Example 6) for 6 months. Thereafter, a mixing chip was attached to each cartridge, the pastes were extruded by a dispenser to be kneaded together, and the number of air bubbles contained in each of the obtained cured products was counted. In Examples and Comparative Examples, the mean value of measurement data obtained for 5 samples under the same conditions was taken as the average number of air bubbles. The results are shown in Table 2. Further, the tensile strength at break of each of the test samples was measured in same manner of Examples 1 to 3 and Comparative Examples 1 to 3. The results are also shown in Table 2.

TABLE 2

|  | decompression and sealing by heat | preservation state | number of air bubbles | tensile strength/MPa |
|---|---|---|---|---|
| Ex. 4 | used | room temperature | 10 | 1.0 |
| Ex. 5 | used | 25° C. thermostatic chamber | 4 | 1.2 |
| Ex. 6 | used | 15 to 30° C. | 8 | 1.2 |
| C. Ex. 4 | not used | room temperature | 41 | 0.7 |
| C. Ex. 5 | not used | 25° C. thermostatic chamber | 33 | 0.8 |
| C. Ex. 6 | Not used | 15 to 30° C. | 81 | 0.6 |

Ex.: Example
C. Ex.: Comparative Example terminals which is a base monomer, 20 parts by weight of fumed silica surface treated with polymethylsiloxane (specific surface area of 200 $m^2$/g) and 10 parts by weight of It is understood from the results of Table 2 that the average number of air bubbles contained in a cured product manufactured from the silicone composition of the present invention which is cured by a condensation reaction and whose components are kept under reduced pressure is much smaller in the three types of preservation state than that contained in a cured product manufactured from a silicone composition which is cured by a condensation reaction and whose components are kept at normal pressure. It is also understood that the tensile strength of a cured product manufactured from the silicone composition of the present invention whose components are kept under reduced pressure is much higher in the three types of preservation state than that of a cured product manufactured from a composition whose components are kept at normal pressure. It is understood from this that the preservation method of the present invention is effective.

Effect of the Invention.

According to the preservation method of the present invention, the number of air bubbles contained in a cured product of a silicone composition can be greatly reduced. Thereby, a reduction in the strength and physical properties of the cured product can be prevented and airtightness can be maintained.

What is claimed is:

1. A method of preserving two or more separately packaged agents for forming a silicone composition which can be cured by mixing the separately packaged agents, wherein the separately packaged agents are kept under reduced pressure.

2. The preservation method of claim 1, wherein each separately packaged agent is kept in a decompressed sealing material.

3. The preservation method according to claim 1, wherein the silicone composition is an addition-polymerization-type silicone rubber composition.

4. The preservation method according to claim 1, wherein said silicone composition comprises (a) a polyorganosiloxane base polymer, (b) a crosslinking agent and (c) a curing catalyst.

5. The preservation method according to claim 4, wherein said polyorganosiloxane base polymer (a) is a polysiloxane having a monovalent substituted hydrocarbon group or a nonsubstituted hydrocarbon group.

6. The preservation method according to claim 4, wherein said crosslinking agent (b) is selected from the group consisting of alkoxysilane, acetoxysilane, oximesilane, partly hydrolyzed products thereof and cyclic siloxanes.

7. The preservation method according to claim 4, wherein said crosslinking agent (b) is 0.1 to 20 parts by weight per 100 parts by weight of said polyorganosiloxane base polymer (a).

8. The preservation method according to claim 4, wherein said curing catalyst (c) is a metal carobyxlate or an organic tin compound.

9. The preservation method according to claim 4, wherein said curing catalyst (c) is 0.01 to 5.0 parts by weight per 100 parts by weight of said polyorganosiloxane base polymer (a).

10. A kit of two or more separately packaged agents for forming a curable silicone composition which can be cured by mixing the separately packaged agents, wherein each agent is contained in a container and the container is enclosed in a decompressed sealing material.

11. The kit of claim 3, wherein the sealing material is a bag.

12. The kit of two or more separately packaged agents according to claim 10, wherein the silicone composition is an addition-polymerization-type silicone rubber composition.

* * * * *